United States Patent [19]

Nishida et al.

[11] Patent Number: 5,014,140
[45] Date of Patent: May 7, 1991

[54] APPARATUS FOR DRAWING OUT TAPE FROM A CASSETTE

[75] Inventors: Ikuo Nishida, Katsuta; Shinichi Hanawa, Mito; Hideyuki Kawase, Katsuta, all of Japan

[73] Assignee: Hitachi, Ltd., Tokyo, Japan

[21] Appl. No.: 480,379

[22] Filed: Feb. 14, 1990

Related U.S. Application Data

[60] Continuation of Ser. No. 189,819, May 3, 1988, abandoned, Division of Ser. No. 843,670, Mar. 25, 1986, Pat. No. 4,757,398.

[30] Foreign Application Priority Data

Mar. 27, 1985 [JP] Japan ................................. 60-60579

[51] Int. Cl.$^5$ ........................................... G11B 15/665
[52] U.S. Cl. ........................................... 360/85; 360/95
[58] Field of Search ....................... 360/85, 95, 105, 84

[56] References Cited

U.S. PATENT DOCUMENTS

| | | | |
|---|---|---|---|
| 4,365,277 | 12/1982 | Namiki | 360/85 X |
| 4,556,922 | 12/1985 | Erhart | 360/85 |
| 4,642,713 | 2/1987 | Ohira et al. | 360/85 |
| 4,665,450 | 5/1987 | Hirano | 360/84 |
| 4,686,591 | 8/1987 | Kobayashi et al. | 360/85 |

*Primary Examiner*—David J. Severin
*Attorney, Agent, or Firm*—Antonelli, Terry, Stout & Kraus

[57] ABSTRACT

A magnetic recording and/or reproducing apparatus is disclosed, comprising a rotary head device, in which a magnetic tape is drawn out of a cassette and brought into contact with the rotary head device or the like. A tape draw-out device doubling as a tape guide forms a predetermined tape path and guides the drive of the magnetic tape after drawing out the magnetic tape. The apparatus further requires a fixed magnetic head and other tape guide mechanism which are movably arranged on the path of the tape draw-out device during the apparatus operation for reducing the size thereof. With the tape loading operation, the fixed magnetic head and the other tape guide are moved by a common drive mechanism and held in position by a common stopper.

3 Claims, 5 Drawing Sheets

APPARATUS FOR DRAWING OUT TAPE FROM A CASSETTE

This application is a continuation of application Ser. No. 189,819, filed on May 3, 1988, now abandoned, which is a divisional of application Ser. No. 843,670, filed Mar. 25, 1986, now U.S. Pat. No. 4,757,398.

BACKGROUND OF THE INVENTION

The present invention relates to an apparatus for drawing out magnetic tape from a cassette to form a predetermined running route, or more in particular to a tape guide mechanism for a magnetic recording and/or reproducing apparatus in which the magnetic tape drawn out of the cassette is attached to a rotary magnetic head or other magnetic head.

In a magnetic recording and/or reproducing apparatus including a video cassette recorder, when a cassette containing the magnetic tape is loaded in the apparatus, a part of the tape guide for forming a predetermined tape path for the recording or reproducing operation is moved and the magnetic tape is drawn out of the cassette thereby to attach the magnetic tape to the rotary magnetic head, fixed magnetic head or the like. A mechanism for moving the part of the tape guide and a space therefor are required in order to perform the operation of drawing out the magnetic tape from the cassette and forming a predetermined tape path (hereinafter called "the tape-loading operation" in this specification). With the demand for a smaller size of the magnetic recording and reproducing apparatus, it is desirable to reduce the size of the mechanism for moving a part of the tape guide. An example having a construction meeting such a demand is disclosed in the U.S. Pat. No. 4,499,513. In this example, a fixed magnetic head which remains stationary during recording or reproducing operation, and is not required to be moved during such operation, is capable of being moved with the tape-loading operation. A part of the route of the tape guide for drawing out the magnetic tape is overlaid on the fixed magnetic head arrangement, thus reducing the size of the apparatus.

In this example, however, the magnetic tape is attached to the rotary magnetic head unit over the range off nearly 180°, and therefore there remains a margin left for further size reduction. It may be possible to make the apparatus more compact by reducing the diameter of the rotary magnetic head to increase the angle of attachment (contact) of the magnetic tape from 180° to, say, 270°. Even so, the same recording pattern as in the case of 180° attachment can be formed on the magnetic tape by giving special consideration to the arrangement of the rotary magnetic head and the rotational speed thereof. By reducing the size of the rotary magnetic head device, therefore, it is possible to make the apparatus even more compact. If another tape guide for moving the tape from within the cassette outward with the tape-loading operation is provided in addition to the tape guides for guiding the tape drive on the entrance and delivery sides of the rotary magnetic head unit, it is possible to realize a small tape path effective for reducing the apparatus size.

SUMMARY OF THE INVENTION

The object of the present invention is to provide a mechanism for the apparatus having the above-mentioned additional tape guide, in which the movement of the fixed magnetic head and the additional tape guide is secured in simple manner with the tape loading operation.

In order to achieve the above-mentioned object, there is provided according to the present invention a magnetic recording and/or reproducing apparatus comprising means for movably holding additional guide means other than a tape guide for tape drawing and driving, means for movably holding a fixed magnetic head, and means engaged with the above-mentioned two means for driving the movement thereof, the drive means having cam means for driving one of the two holding means, thereby to obtain a predetermined locus of operation.

BRIEF DESCRIPTION OF THE DRAWINGS

The above and other objects, features and advantages will be made apparent by the detailed descriptions taken in conjunction with the accompanying drawings, in which.

DESCRIPTION OF THE PREFERRED EMBODIMENT

An embodiment of the present invention will be explained with reference to FIGS. 1 to 10.

Figure 1:
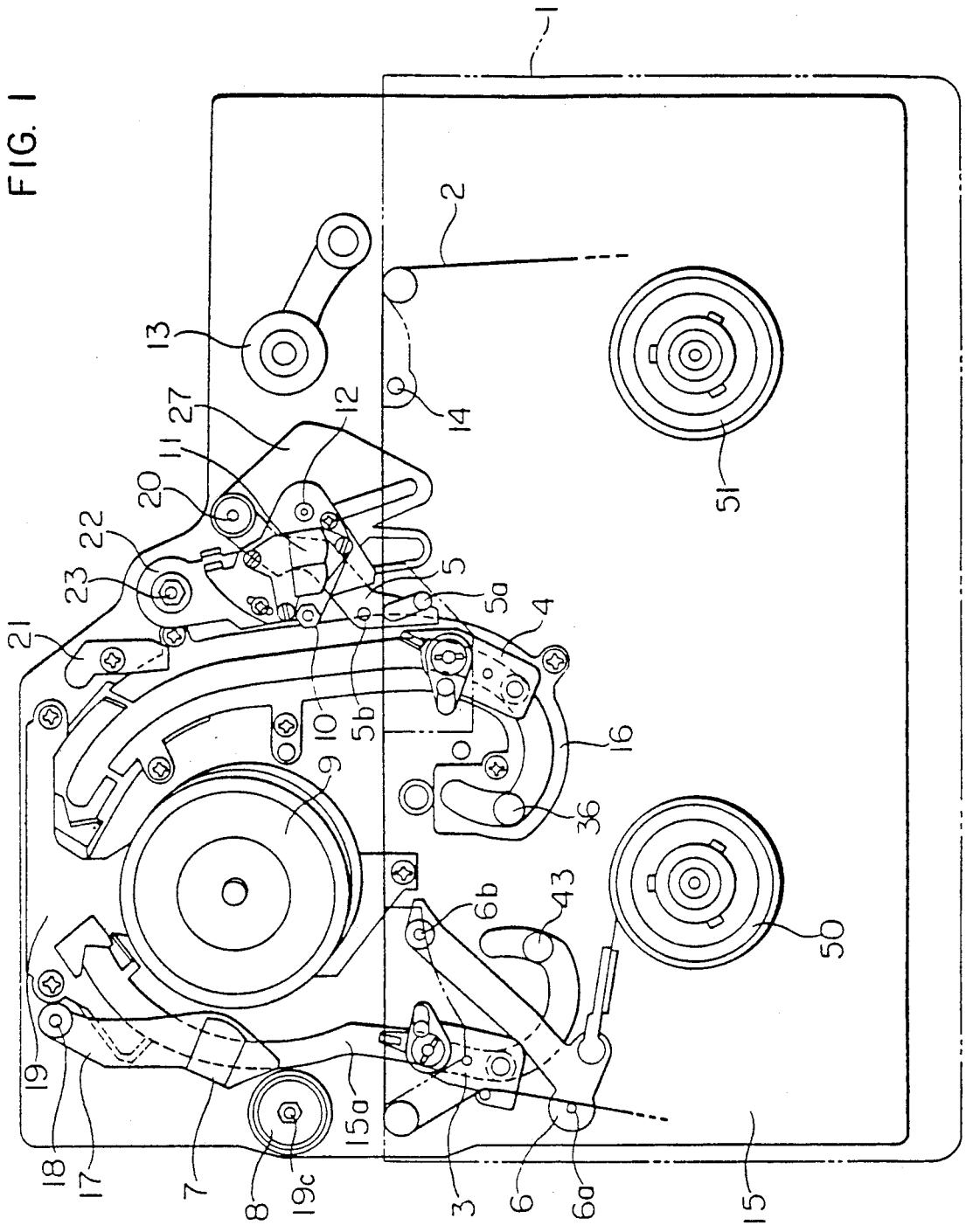
FIG. 1 is a diagram showing a mechanism of and around the rotary magnetic head unit of a magnetic recording and/or reproducing apparatus according to an embodiment of the present invention.

FIG. 1 is a diagram showing an arrangement of the essential parts of a magnetic recording and/or reproducing apparatus including a cassette-mounting part, a rotary magnetic head unit and peripheral parts thereof. A cassette 1 containing a magnetic tape is diagramatically illustrated with a two-dot chain but will not be described in detail.

Figure 3:
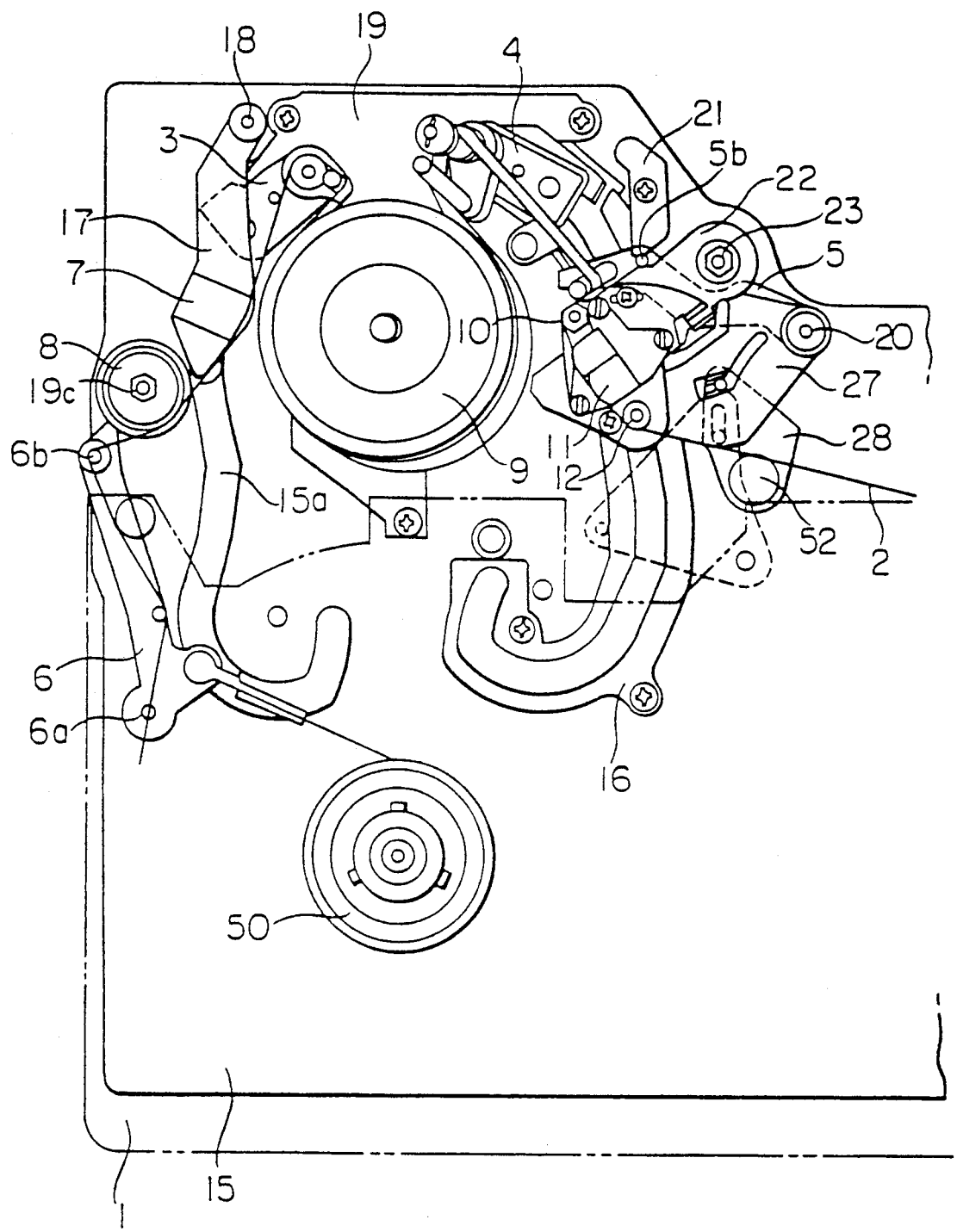
FIG. 3 is a plan view showing the essential parts with the tape loading operation completed for the apparatus shown in FIG. 1.

The tape 2 in the cassette 1 takes the position as shown in FIG. 1 when the cassette 1 is loaded in the apparatus. With the tape loading operation, the tape 2 takes the running path as shown in FIG. 3 as two guide roller blocks 3, 4 having a roller and a tilt pin, a tilt pin 5a fixed on a guide arm 5 and a tension-compensating pin 6b fixed on a T arm move from the position in the cassette to the respective predetermined driving positions thereof. In the process, the tape 2 is brought into contact with a full erase head 7, an impedance roller 8, a rotary cylinder 9, a guide 10, an audio control head (hereinafter called "AC head") 11 and a guide 12 respectively. When the pinch roller 13 is pressed against the capstan 14, the tape 2 held therebetween is driven and driven in steady manner.

In recording mode, the full erase head 7 erases the recorded signal over the whole width of the magnetic tape passing therethrough. The impedance roller 8 is driven by the tape movement for stabilizing the tape drive condition. The rotary cylinder 9, which makes a part of the rotary magnetic head unit, is normally arranged in opposed relationship with the fixed cylinder 5 concentrically therewith, with a plurality of magnetic heads (not shown) protruded slightly from the peripheral surface thereof facing the fixed cylinder, thus forming parallel diagonal recording tracks on the magnetic tape 2. The AC head 11 is a duplex head with two integrated magnetic heads for forming a longitudinal audio signal track and a control signal track along the edge of the magnetic tape. These parts have basically the same configuration as the corresponding parts of a well-known cassette video recorder such as of VHS system.

Figure 10:
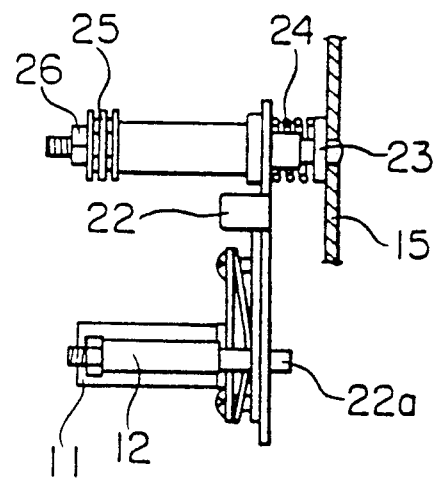
FIG. 10 shows an example of means for holding an audio control head.

The guide roller blocks 3 and 4 are slidably held along a guide hole 15a and a guide 16 formed on a chassis 15 while being pressed from the upper and lower sides thereof respectively. The T arm 6 is rotatably held around the shaft 6a, and has at an end thereof a pin 6b in contact with the tape. The full erase head 7 is mounted on an FE head arm 17, which in turn is rotatably held on the shaft 18 fixed on the chassis 15 while being urged to the shown position by a spring not shown. With the tape loading operation, the movement of the guide roller block 3 causes the peripheral side of the FE head arm 17 to be relieved in opposition to the energization force of the spring in contact with the guide roller block 3, thus preventing the movement of the guide roller block 3 from being interfered. The impedance roller 8 is rotatably held on the shaft 19c fixed on the chassis 15. The rotary cylinder 9 is mounted on a C base 19 having a positioning stopper for the guide roller blocks 3, 4, and the C base 19 is fixed on the chassis 15 with three screws. The guide pin arm 5 has a tilt pin 5a and is rotatably held on the shaft 20 fixed on the chassis 15. The guide pin arm 5 also has a pin 5b. The stopper 21 is secured with screw to the chassis 15 in a position to receive the pin 5b as shown in FIG. 3. The guides 10 and 12 are held on the AC head arm 22. The AC head 11 is held in such a manner that the position thereof may be finely adjusted on the AC head arm 22. The AC head arm 22 is rotatably held on the shaft 23 fixed on the chassis 15, and being pressed upward along the axis of the shaft 23, is secured by a nut 26 through a thrust bearing 25 (FIG. 10). The drive arm 27 is rotatably held in a manner overlaid on the rotary shaft 20 of the guide pin arm 5, and includes a cam slot 27a in mesh with the pin 22a (FIG. 10) of the AC head arm 22 (FIGS. 5 and 8), a spring 27b pressing the guide pin arm 5 (FIG. 8), a spring 27c (FIG. 8), a cam slot 27d (FIG. 8), and a stopper 27e (FIG. 8) engaged with a stopper member 5c (FIGS. 5 and 7) of the guide pin arm 5.

Figure 2:
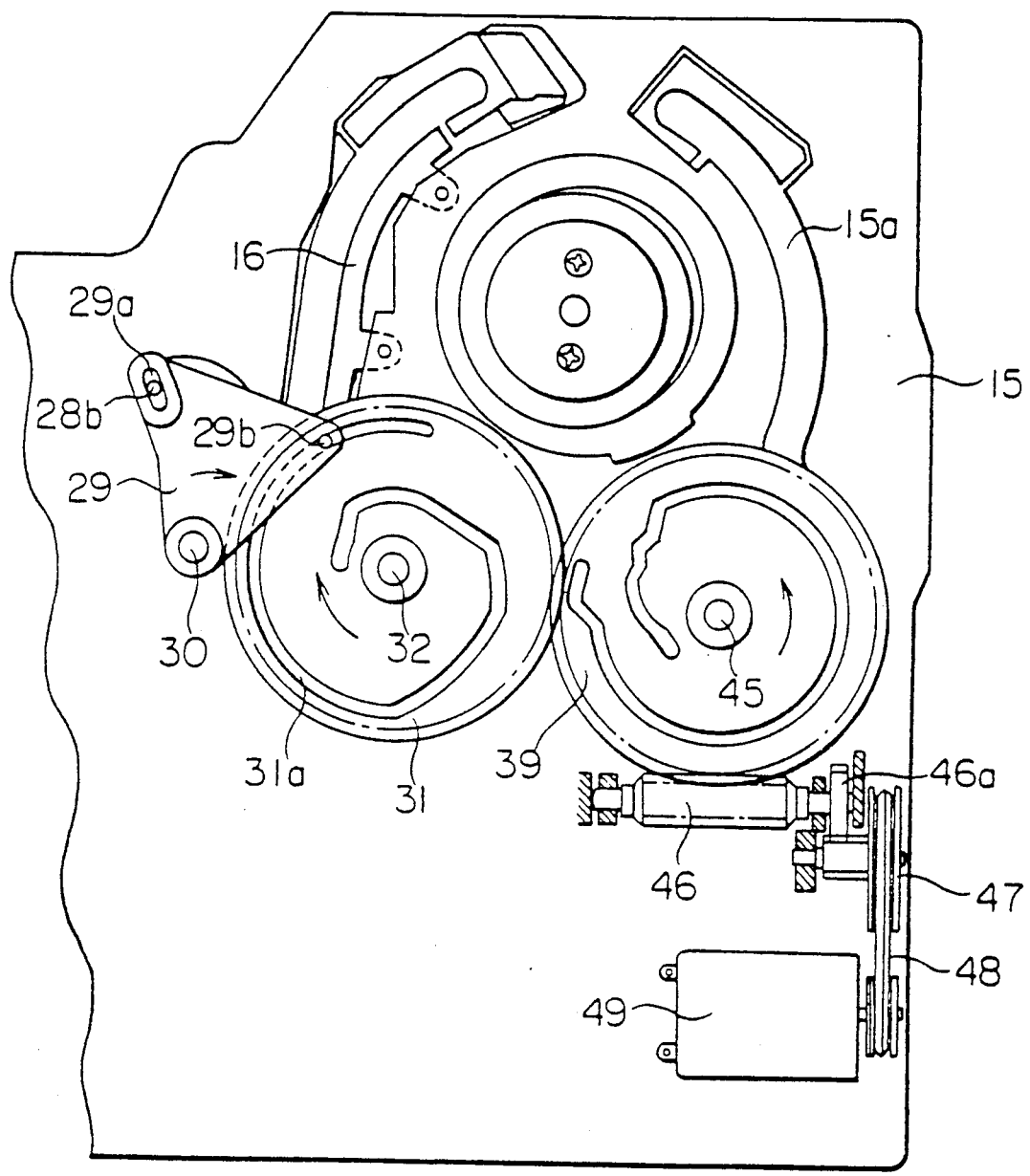
FIG. 2 shows the back side of the essential parts of FIG. 1.
Figure 4A:
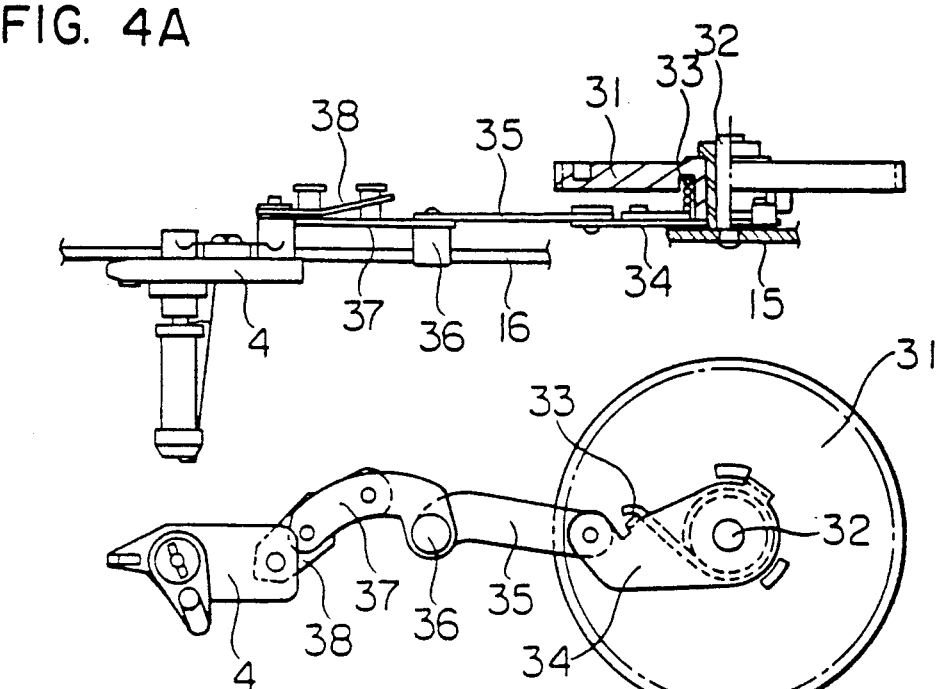
FIGS. 4A to 4C show an example of the guide roller block and a part of a drive mechanism for drawing and guiding the tape, as viewed from three directions.
Figure 4B:
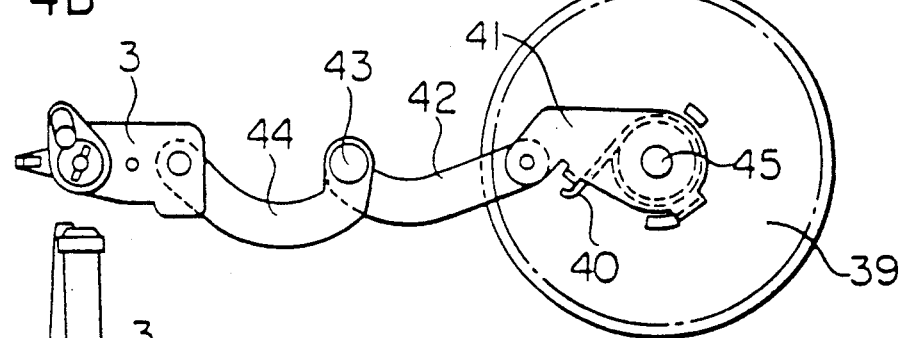
Figure 4C:
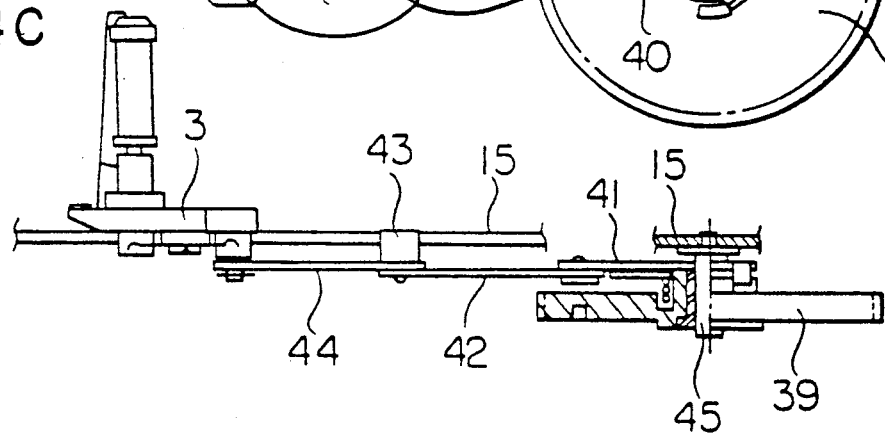
Figure 5:
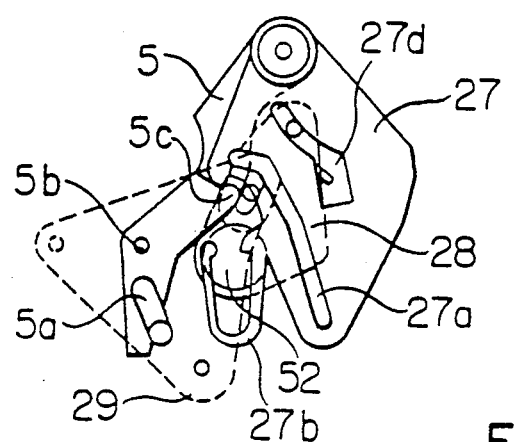
FIGS. 5 to 8 are plan views showing an example of the shape of the essential parts used with an embodiment of the present invention.
Figure 6:
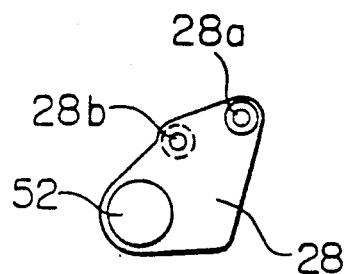
Figure 7:
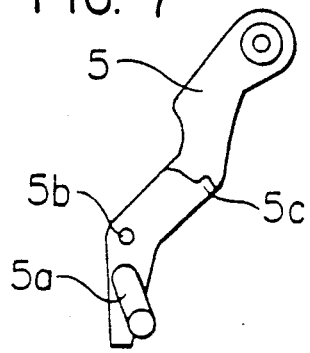
Figure 8:
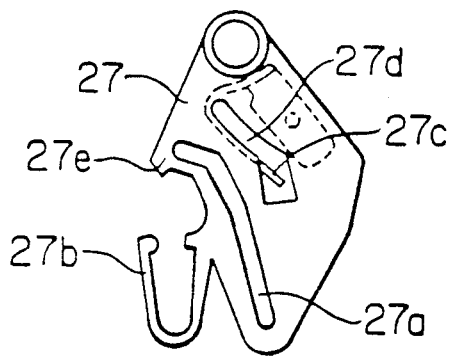
Figure 9:
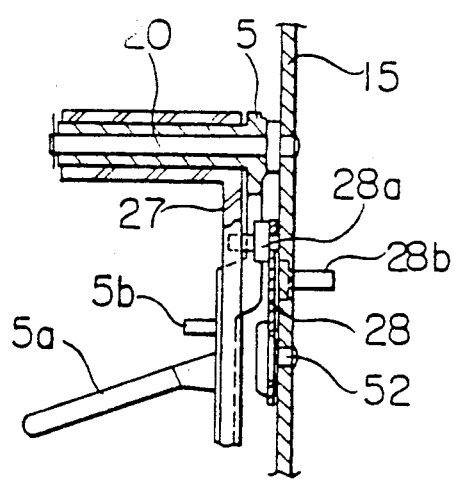
FIG. 9 is a sectional view showing an arrangement of a guide pin arm.

The operating arm 28 (FIG. 6) is rotatably held on the chassis 15 by the shaft 52, and includes a pin 28a engaged with the spring plate 27c and the cam slot 27d and a pin 28b engaged with the hole 29a of the operating arm 29 (FIGS. 2 and 5). The operating arm 29, as shown in FIG. 2, is rotatably held on the back side of the chassis 15 to the shaft 30 secured to the chassis 15, and has a pin 29b engaged with the cam slot 31a of the cam gear 31. The cam gear 31, on the other hand, is held rotatably on the shaft 32 secured to the chassis 15. As shown in FIG. 4B, a link 34 is rotatably held on the cam gear 31 coaxially with the shaft 32 while being urged in a rotational direction by the spring 33. The link 34 has coupled therewith a link 35 and a link 37 coupled to the link 35 through a shaft 36. The link 37 carries a plate 38 (FIG. 4A) held with a play by two shafts. The cam gear 31 has a toothed outer periphery in mesh with a cam gear 39 of a similar construction. The cam gear 39, in substantially the same manner as the cam gear 31, has a spring 40, links 41, 42, a shaft 43 and a link 44 coupled thereto, except any part corresponding to the plate 38 (FIG. 4C). The plate 38 is connected with the guide roller block 4, and the link 44 with the guide roller block 3, respectively in a hole-shaft relationship with each other. The shaft 43 is operatively controlled by the hole 15a, and the shaft 36 by the guide 16. The cam gear 39 is engaged with a worm gear 46 as shown in FIG. 2, and the worm gear 46, rotatably held on the chassis 15, has a gear 46a. The gear 46a is engaged with the teeth of the pulley gear 47, and the pulley of the pulley gear 47 has a rubber belt 48 hung thereon, which is connected with the pulley of a DC motor 49 to transmit the turning effort of the DC motor 49. A supply reel base 50 and a take-up reel base 51 are rotatably held on the chassis 15.

The operation will be explained below. When the cassette 1 is loaded and the DC motor 49 is energized in the loading direction, the turning effort therof is transmitted to the rubber belt 48, pulley gear 47, worm gear 46, cam gears 39 and 31. With the rotation of the cam gears 31, 39, the guide roller blocks 3 and 4 engaged with the links 34, 35, 37, 41, 42 and 44 in contact with the cam gears 31, 39 are moved toward the positioning part of the C base 19 while being controlled by the guide hole 15a and the guide 16. When the cam gear 31 is rotated to an extent where the guide roller block 4 just begins to pass the AC head 11, the operating arm 29 engaged with the cam slot of the cam gear 31 is rotated in the direction of arrow by the displacement of the cam slot as shown in FIG. 2. With this rotation of the operating arm 29, the operating arm 28 begins to rotate, so that the driving arm 27 engaged therewith also begins to rotate. In the process, the operating arm 29 presses the pin 28b, and the pin 28a presses the cam slot 27d to transmit the above-mentioned turning effort. With the rotation of the driving arm 27, the guide pin arm 5 begins to rotate by being pressed by the spring 27b, and when the tilt pin 5a reaches a point passing the front part of the AC head 11, the cam slot 27a begins to press the pin 22a, with the result that the AC head arm 22 carrying the guide 10, AC head 11 and the guide 12 begins to rotate. The time lag of the operation is determined by the shape of the cam slot 27a. When this operation makes a progress to such a point where the guide roller blocks 3, 4 draw out the tape 2 and reaches the positioning part of the C base 19 while being in contact with the rotary cylinder 9, the springs 33, 40 (FIG. 4b) are displaced, thereby pressing the guide roller blocks 3, 4 against the positioning part. At about this time point, the rotational operation of the guide pin arm 5 and the AC head arm 22 is almost completed. First, the pin 5b of the guide pin arm 5 hits the stopper 21 and stops rotating, so that the spring 27b begins to be displaced Then the AC head arm 22 hits the pin 5b and thus comes to stop, thereby holding the pin 5b. When the AC head arm 22 stops, the pin 28a makes a further movement while displacing the spring plate 27c, and at this point, the DC motor 49 is stopped. In the process, the tape 2 is drawn out at a predetermined driving position as shown in FIG. 3, and the tape guide member is held stable at predetermined position. After that, the pinch roller 13, holding the tape 2, presses the capstan 14, with the result that the tape 2 is driven in steady manner as the capstan 14 is rotated.

In the operation of accomodating the tape 2 into the cassette 1, the DC motor 49 is energized in the unloading direction opposite to the foregoing description, and the resulting operation reverse to the loading operation mentioned above restores the original position. In this case, the tape of the length drawn out of the cassette is taken up by the rotation of the supply reel base 50 or the take-up reel base 51 thereby to accommodate the tape into the cassette.

We claim:

1. A magnetic recording and reproducing apparatus for winding a magnetic tape in a predetermined range around a rotary magnetic head unit to perform record and/or reproduction, comprising:
    a first tape guide means operable to be at a first position in a space occupied by a loaded cassette when the tape is not drawn for loading and to be at a supplying position facing one supplying position side of the rotary magnetic head unit when drawing the tape,
    a second tape guide means operable to be at a second position in the space occupied by the loaded cassette when the tape is not drawn for loading and to be at a take-up position facing one take-up position side of the rotary magnetic head unit when drawing the tape,
    a first draw-out means for moving said first and second tape guide means from said first and second positions to said supplying and take-up sides of the rotary magnetic head unit, respectively,
    an audio control head for recording and reproducing an audio signal and a control pulse signal on and from the tape, said audio control head being located in a tape path when the tape is loaded;
    a third tape guide means operable to be at a third position in the space occupied by the loaded cassette when the tape is not drawn for loading and to be at a fourth position between said second tape guide means and said audio control head when drawing the tape, said third tape guide means being inclined with respect to the bottom surface of said cassette at said third and fourth positions, and
    a second draw-out means for moving said third tape guide means from said third position to said fourth position while maintaining an inclined attitude of said third tape guide means with respect to the bottom surface of said cassette.

2. A magnetic recording and reproducing apparatus according to claim 1, wherein said third tape guide means is provided with a rotating fulcrum which is outside of said predetermined tape drive path and almost behind said audio control head, and said third tape guide means is operable to be rotated to pass over the front part of said audio control head as said third tape guide means moves from said third position to said fourth position.

3. A magnetic recording and reproducing apparatus according to claim 2, wherein said second draw-out means is operable to move following the movement of said second tape guide means from said second position to said take-up position.

* * * * *